(12) United States Patent
Teplitsky et al.

(10) Patent No.: US 9,698,863 B2
(45) Date of Patent: Jul. 4, 2017

(54) METHODS AND ARRANGEMENTS FOR SPUR ESTIMATION OF A WIRELESS COMMUNICATION PACKET

(71) Applicant: Intel IP Corporation, Santa Clara, CA (US)

(72) Inventors: Moshe Teplitsky, Tel-Aviv (IL); Michael Genossar, Modiin (IL); Elan Banin, Raanana (IL)

(73) Assignee: Intel IP Corporation, Santa Clara, CA (US)

( * ) Notice: Subject to any disclaimer, the term of this patent is extended or adjusted under 35 U.S.C. 154(b) by 579 days.

(21) Appl. No.: 14/229,812

(22) Filed: Mar. 28, 2014

(65) Prior Publication Data

US 2016/0294584 A1 Oct. 6, 2016

(51) Int. Cl.
*H04B 1/10* (2006.01)
*H04B 1/71* (2011.01)
*H04L 25/06* (2006.01)
*H04W 84/12* (2009.01)

(52) U.S. Cl.
CPC ......... *H04B 1/7101* (2013.01); *H04B 1/1027* (2013.01); *H04L 25/06* (2013.01); *H04W 84/12* (2013.01)

(58) Field of Classification Search
CPC . H04B 1/00; H04B 1/71; H04B 1/713; H04B 1/7101; H04B 1/2027; H04B 7/12; H04B 17/00; H04B 10/27; H04L 7/00; H04L 7/02; H04L 25/06; H04L 25/069; H04W 1/10; H04W 84/12

USPC .............. 375/135, 296, 316, 346, 360, 371; 455/42, 67.11, 130

See application file for complete search history.

(56) References Cited

U.S. PATENT DOCUMENTS

| | | | | |
|---|---|---|---|---|
| 7,317,774 | B2* | 1/2008 | Richey | H03M 1/0614 375/355 |
| 8,031,101 | B2* | 10/2011 | Narasimhan | H03M 1/1042 341/118 |
| 8,451,918 | B1* | 5/2013 | Cheng | H04K 3/228 370/208 |
| 9,391,823 | B2* | 7/2016 | Lindoff | H04B 15/06 |
| 2005/0059366 | A1* | 3/2005 | Choi | H04L 27/2647 455/130 |
| 2006/0087461 | A1* | 4/2006 | Danzig | H04B 15/04 341/118 |

(Continued)

*Primary Examiner* — Shawkat M Ali
(74) *Attorney, Agent, or Firm* — Schubert Law Group PLLC (57) ABSTRACT

Logic for spur estimation of a wireless communication packet. Logic may receive an input signal output by a set of analog-to-digital converters and determine means of sequences for each of the analog-to-digital converters. The sequences may be from a preamble of the wireless communication packet. The sequences may comprise a set of short training sequences with an average zero mean received after logic detects a boundary of the sequences. The set of short training sequences may comprise a Golay sequence Ga and a Golay sequence −Ga. Logic may determine spur estimations for each of the analog-to-digital converters based upon a frequency offset estimation for the wireless communication packet. Logic may remove a mean of the spur estimations from the spur estimations. And logic may remove the spur estimations from the packet.

21 Claims, 5 Drawing Sheets

(56) References Cited

U.S. PATENT DOCUMENTS

| | | | | |
|---|---|---|---|---|
| 2007/0153878 A1* | 7/2007 | Filipovic | .............. | H04B 1/1036 |
| | | | | 375/147 |
| 2008/0101212 A1* | 5/2008 | Yu | ................. | H04L 27/2655 |
| | | | | 370/208 |
| 2010/0304677 A1* | 12/2010 | Pop | ................. | H04B 1/28 |
| | | | | 455/42 |
| 2010/0316175 A1* | 12/2010 | Zeng | ................. | H04L 7/042 |
| | | | | 375/360 |
| 2012/0207192 A1* | 8/2012 | Zhang | ................. | H04J 13/102 |
| | | | | 375/135 |
| 2014/0294117 A1* | 10/2014 | Tarleton | ................. | G06F 1/022 |
| | | | | 375/296 |

\* cited by examiner

METHODS AND ARRANGEMENTS FOR SPUR ESTIMATION OF A WIRELESS COMMUNICATION PACKET

TECHNICAL FIELD

Embodiments are in the field of wireless communications. More particularly, embodiments may involve online spur estimation in wireless communication signals and mitigation or correction of the signal for spur estimation.

BACKGROUND

A wireless local area network (WLAN) may facilitate wireless communications between wireless communication devices. High-speed wireless communications such as is used in WiGig (IEEE 802.11ad) Signal Carrier PHY mode may require performance of high-rate analog-to-digital conversions. Performing high rate analog-to-digital conversion (ADC) may require multiple time-interleaved ADC components. In practice, differences between the different ADC components degrade the overall performance. One of the major impairments is the different DC bias of each ADC, which causes harmonics (spurs) at the ADC output. In addition, system clocks that are harmonics of the fundamental ADC rate will also result in spurs at the output of the ADC.

Spur impairment can cause errors in receipt of data packets of the signal and reduce data throughput on the wireless communications channel. When communicating, for example, at relatively high Signal-to-Noise-Ratio (SNR) levels, mitigation of spur impairment of a received signal at a relatively high accuracy level may be required for acceptable data throughput.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Embodiments may include an energy detection device that recognizes a wireless communication signal and may enable a receiver to receive the wireless communication signal. In many embodiments, an antenna or antenna array may receive the signal and pass the signal to a radio for processing. The radio may, for instance, remove quadrature and phase imbalances, convert the signal to a digital signal, and pass the signal to time domain logic for processing.

In many embodiments, the received signal may include a direct current bias and frequency offset. One of the major impairments is the different DC bias of each ADC that causes harmonics (spurs) at the ADC output. The time variant spur may appear in the form of harmonics at the output of the analog-to-digital converter (ADC). In addition, system clocks that are harmonics of the fundamental ADC rate will also result in spurs at the output of the ADC.

The frequency offset may manifest as a phase rotation between sequences in a packet of a wireless communication. Due to frequency offset (FO), there may be a rotation of $e^{j\theta}$ between the sequences in the preamble of the packet.

Embodiments may estimate the spur associated with each of the ADC components and remove the spur estimation from the packet. In many embodiments, the spur estimation for each of the ADC components may be removed from the packet prior to Channel Estimation (CE).

In many embodiments, spur logic may perform the spur estimation by determining means of sequences for each of the analog-to-digital converters, wherein the sequences are from a preamble of the wireless communication packet. In several embodiments, the sequences may comprise a set of short training sequences with an average zero mean received after acquisition (ACQ) logic detects a boundary of the sequences. And, in many embodiments, the spur logic may use the means of the last two sequences in a short training field (STF) of the preamble (zero mean section) of the wireless communication packet along with a frequency offset estimation to determine the spur estimation.

In some embodiments, a separate DC bias estimation may be implemented in the receiver to remove the receiver and/or transmitter DC bias from the packet. In such embodiments, the mean of the spur estimations for the ADC components may be removed from each of the spur estimations prior to removal of the spur estimations from the packet.

To illustrate, several embodiments may perform spur estimation and mitigation in WiGig (IEEE 802.11ad) Signal Carrier PHY mode and Orthogonal Frequency-Division Multiplexing (OFDM) PHY mode. Such embodiments may implement 16 time-interleaved, ADC components for an In-phase portion of the communication signal and 16 time-interleaved, ADC components for a Quadrature phase portion of the communication signal. Each of the 32 ADC components may be impaired by DC bias so many embodiments determine spur estimations for each of the 32 ADC components and mitigate the spurs by subtracting the spur estimations from the output of each of the ADC components. In several embodiments, the spur estimations are summed, a means is determined for the components, and the mean is subtracted from the spur estimations so that such embodiments remove the spurs and not the DC bias of the transmitter and receiver.

Other techniques for mitigating the DC impairment in the signal may include a notch filter and a regular mean estimator. Notch filters may include, e.g., a filter with 16-notches to mitigate the spurs but this will damage the signal. The power of the error introduced depends on the bandwidth of the filter and the signal statistical properties. In particular, the filter will damage both the CE field and the data and may result in degradation in resulting equalizer coefficients.

And the regular mean estimator may involve a mean estimation for each of the 16 spur-components that will suffer from a noise floor caused by the STF signal (signal-related DC). Therefore, this method is limited to accuracy of −21 decibels relative to the carrier (dBc) and due to unknown channel, it may be impossible to remove this signal related bias.

Embodiments may offer an improvement over the other techniques by enabling spur estimation and mitigation with insubstantial or no damage to the signal. Many embodiments implement spur logic to use the short training sequence in the STF of a packet that has identical repetitive signal structure [Ga, Ga, . . . Ga]. And many embodiments implement the spur logic to use the section of Golay sequences in the STF that has an average zero mean: [Ga, −Ga]. The WiGig (IEEE 802.1 lad) Signal Carrier PHY mode and OFDM PHY mode may include Golay sequences of Ga and −Ga at the sync position.

Various embodiments may be designed to address different technical problems associated with online spur estimation and mitigation. Other technical problems may include determining means of sequences for each of the analog-to-digital converters, identifying a set of sequences that have an average zero mean, selecting the mean of the last two sequences of the STF, selecting the Ga and −Ga Golay sequences, removing the receiver and transmitter DC bias from the spur estimations, removing the spur estimations from the packet in the wireless communications signal, and/or the like with insubstantial or no damage to the packet.

Different technical problems such as those discussed above may be addressed by one or more different embodiments. For instance, some embodiments that address spur estimation and mitigation may do so by one or more different technical means such as receiving an input signal output by a set of analog-to-digital converters, waiting until receipt of an indication of the detection of a boundary of a sequence, determining means of sequences for each of the analog-to-digital converters, transmitting the means of the sequences that have an average zero mean to the spur estimation logic, receiving the frequency offset estimation by the spur estimation logic, removing the mean of the spur estimations from the spur estimations, removing the spur estimation from the wireless communication packet, and/or the like.

Some embodiments implement WirelessHD Specification Version 1.1D1, May 2010. Several embodiments may implement Ecma International, Standard ECMA-387, High Rate 60 GHz PHY, MAC and PALS, 2nd Ed., December 2010. Further embodiments may implement Wireless Gigabit Alliance, WiGig 1.1 specification, June 2011. Some embodiments implement Institute of Electrical and Electronic Engineers (IEEE) 802.11 systems such as IEEE 802.1 lad systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf).

Some embodiments implement Institute of Electrical and Electronic Engineers (IEEE) 802.15 systems such as IEEE 802.15.3 systems and other systems that operate in accordance with standards such as the IEEE 802.15, IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs), IEEE Computer Society, The Institute of Electrical and Electronics Engineers, Inc., 3 Park Avenue, New York, N.Y., 29 Sep. 2003.

Some embodiments are particularly directed to improvements for wireless local area network (WLAN), such as a WLAN implementing one or more Institute of Electrical and Electronics Engineers (IEEE) 802.11 standards (sometimes collectively referred to as "Wi-Fi", or wireless fidelity).

Some embodiments, implement the Bluetooth® specification (e.g. BLUETOOTH SPECIFICATION Version 4.0, Bluetooth SIG, Inc., Publication date: 30 Jun. 2010). The embodiments, however, are not limited to these standards.

Several embodiments comprise Personal Basic Service Set (PBSS) Central Point, or PCP for and/or client devices of PCPs or stations (STAs) such as docking stations, routers, switches, servers, workstations, netbooks, mobile devices (Ultrabook™, Laptop, Smart Phone, Tablet, and the like).

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

This disclosure is not limited to WLAN related standards, but may also apply to wireless wide area networks (WWANs) and 3G or 4G wireless standards (including progenies and variants) related to wireless devices, user equipment or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The examples are not limited in this context.

While some of the specific embodiments described below will reference the embodiments with specific configurations, those of skill in the art will realize that embodiments of the present disclosure may advantageously be implemented with other configurations with similar issues or problems.

Figure 1:
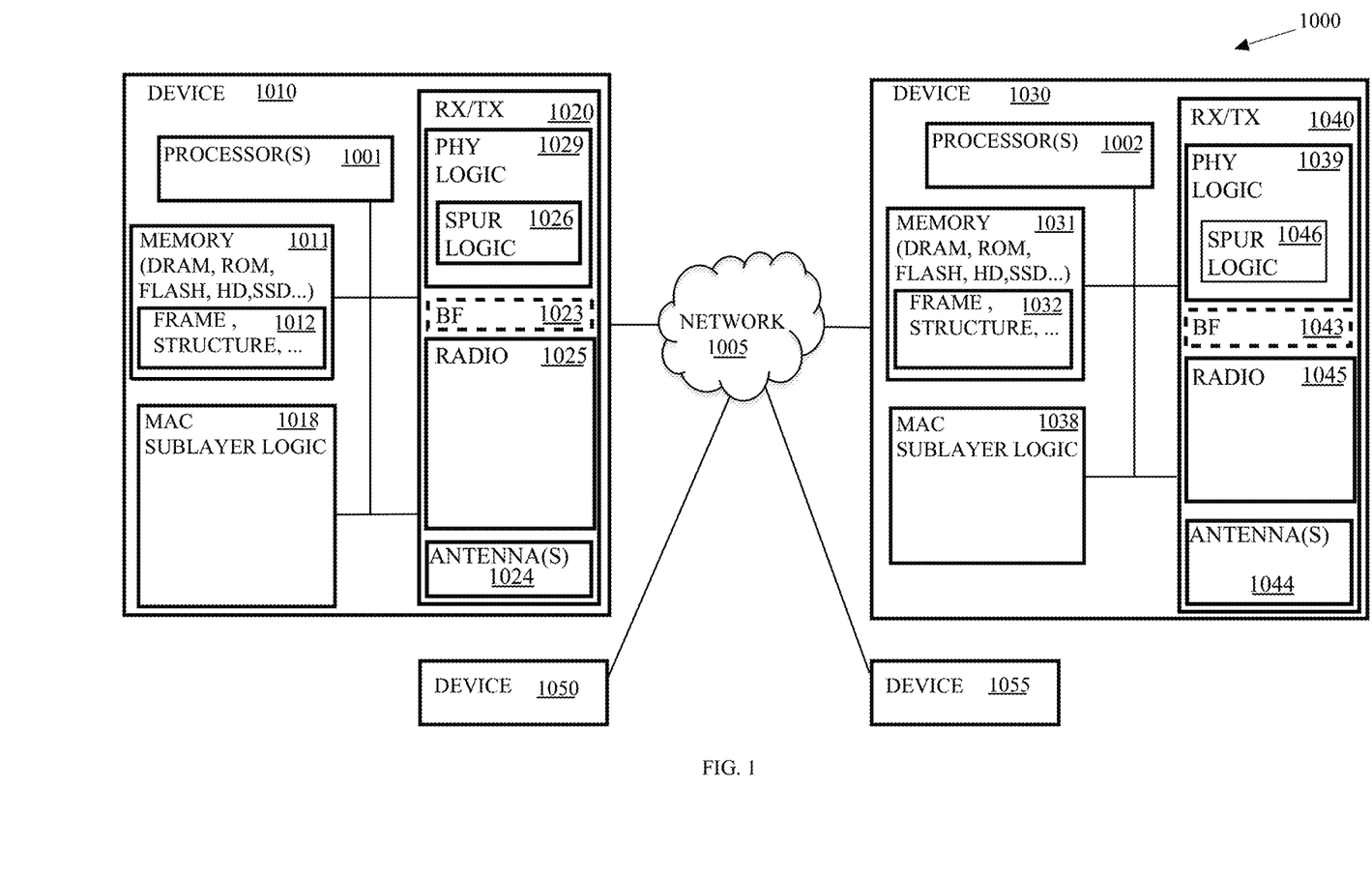
FIG. 1 depicts an embodiment of a wireless network comprising a plurality of communications devices with spur logic to estimate DC bias of the analog-to-digital converters, determine a spur estimation based upon the frequency offset and mitigate spur impairment in packets of a wireless communication signal.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise a docking station that functions as an access point (AP) and/or a Personal Basic Service Set (PBSS) Control Point (PCP). The communications device 1030 may comprise a low power communications device such as a consumer electronics device, a personal mobile device, a netbook, or the like, in the network 1005 of the communications device 1010. The communications device 1050 may comprise a low power communications device such as a consumer electronics device, a personal mobile device, an Ultrabook™, or the like. And communications device 1055 may comprise printers, laptops, netbooks, cellular phones, smart phones, PDAs, or other wireless-capable devices that also operate as stations. Thus, communications devices may be communicatively coupled via the network 1005 and be mobile or fixed.

The communications device 1010 may utilize antenna(s) 1024 to communicate within one or more stations, such as communication devices 1030, 1050, and 1055, and may transmit a wireless communication packet to the communications device 1030. The communications device 1030 may enable the radio 1045 to receive the packet and begin to receive the packet. In many embodiments, the communications device 1010 may transmit a packet with a preamble and a payload. The communications device 1030 may receive the preamble first and the first part of the preamble may include a STF. The STF may comprise multiple short training sequences such as Golay sequences.

The communications device 1030 may comprise a radio 1045 coupled with spur logic 1046. The communications device 1010 may comprise a radio 1025 coupled with similar spur logic 1026 and the communications devices 1050 and 1055 may also comprise radios coupled with spur logic such as the spur logic 1046 in the PHY logic 1039 of the communications device 1030.

The spur logic 1046 may receive the sequences of the STF and begin processing the sequences to determine a stable gain for the signal. After determining a stable gain for the signal and detecting an edge of the sequences, the spur logic 1046 may include logic to determine means of sequences, or blocks, and storing the means in first in first out (FIFO) queues in memory 1031. Memory 1031, in several embodiments, may comprise one or more buffers that are physically located in or are coupled with the radio 1045 and/or the spur logic 1046.

In the present embodiment, the radio 1045 comprises multiple, high rate analog-to-digital conversion (ADC) components. Each of these ADC components introduces a DC bias at their output that causes spurs in the output. To remove the spurs, the spur logic 1046 may estimate the DC bias for each of the ADC components independently.

Furthermore, a frequency offset associated with the receipt of the communications packet, introduces a rotation between the sequences in the packet. As a result, each mean determined for each successive sequence in the packet is rotated by $e^{j\theta}$. The spur logic 1046 may calculate the means of the sequences and compensate for the rotation in the means during the spur estimation based upon a frequency-offset estimation (FOE) by ACQ logic for the communication packet.

After the ACQ logic determines a sync position, which may be, e.g., a Golay sequence pair identified as (Ga, −Ga), the spur logic 1046 may receive the FOE from the ACQ logic and may correct the packet for the FO. After receiving the sync position, the spur logic 1046 may also end the estimations of the means of the Golay sequences in the STF and calculate the spur estimations based upon the means estimations in the FIFO queues in memory 1031.

In many embodiments, the spur logic 1046 identifies the means of a set of sequences that have an average zero mean for the purposes of determining the spur estimations. In WiGig embodiments, the last two Golay sequences in the STF may have an average zero mean. Thus, in such WiGig embodiments, the spur logic 1046 may use the last two means in the FIFO queues for each of the ADC components to determine the spur estimations. In other embodiments, the spur logic 1046 may select the set of sequences with an average zero means or a known average means for the purposes of the spur estimations by indices in the FIFO queues or indices in other data structures for storing the means calculations in memory 1031. For clarity, the set of sequences used for the spur estimations are chosen because the theoretical means for these sequences are known. The spur logic 1046 may determine the spur estimations utilizing the known values such as the known average zero means of the Golay sequences Ga and −Ga.

In several embodiments, the spur logic 1046 may determine the mean of the spur estimations and remove the mean from the spur estimations prior to removing the spur estimations from subsequent blocks in the wireless communications packet. The spur logic 1046 may remove the mean of the spur estimations because another process may determine DC bias estimations and remove the DC bias.

After determining the spur estimations and optionally removing the mean of the spur estimations from the spur estimations, the spur logic 1046 may correct the communications signal for the packet by removing the spur estimations from the subsequent blocks of the packet in the signal.

Figure 2A:
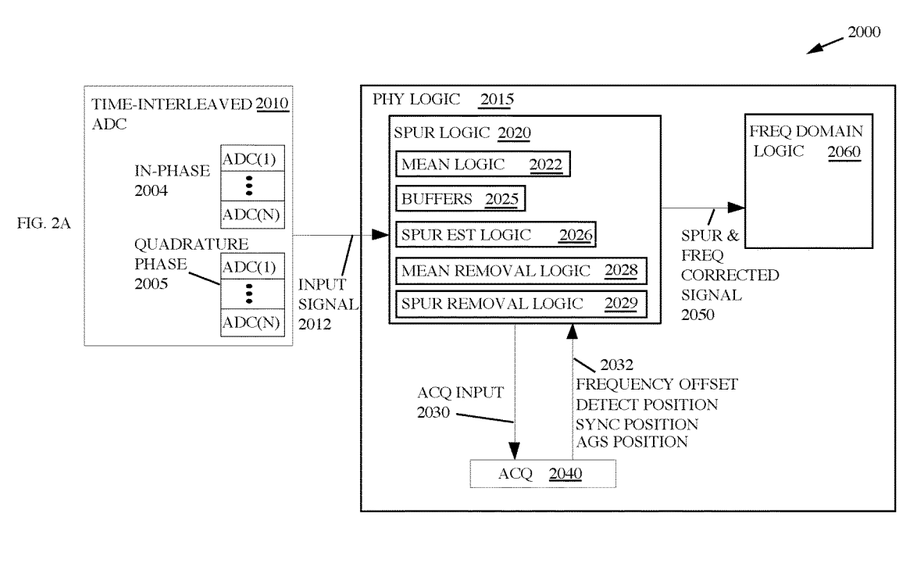
FIG. 2A depicts an embodiment of the spur logic illustrated in FIG. 1.
Figure 2B:
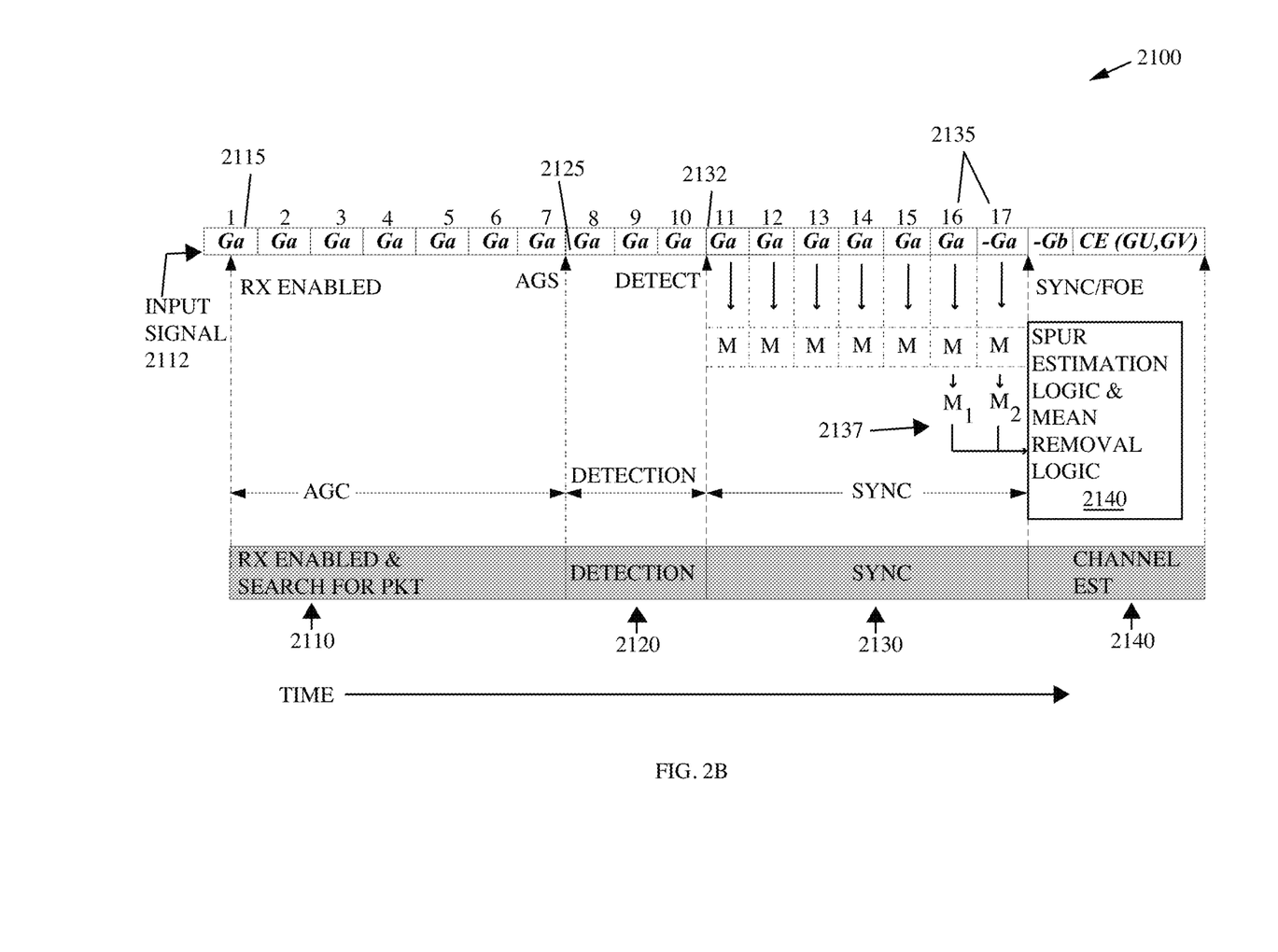
FIG. 2B depicts an embodiment of a timing diagram for spur estimation and mitigation performed by the spur logic in FIG. 2A.
Figure 2C:
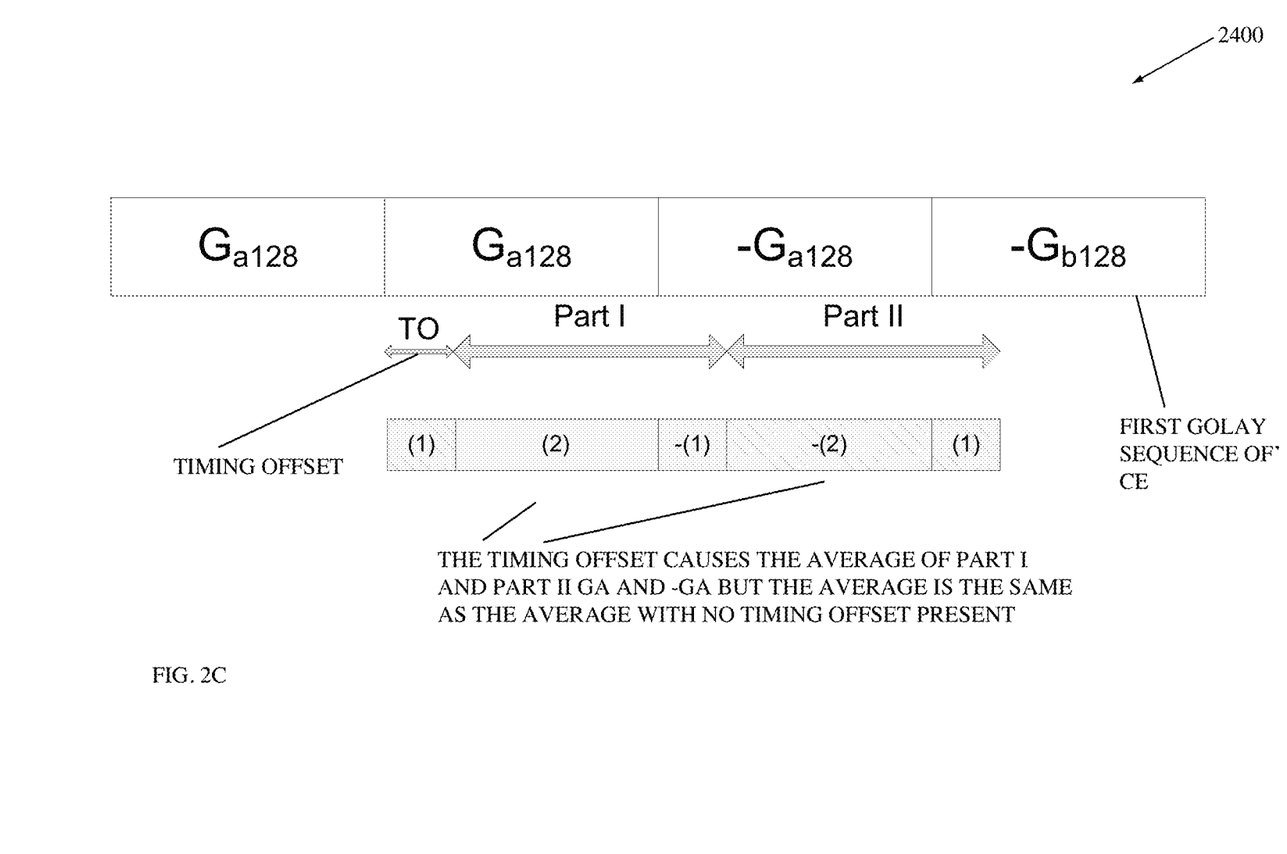
FIG. 2C depicts an embodiment of a low frequency offset Golay sequence of a short training sequence in a preamble of a packet to sample for means estimation along with examples of values of the Golay sequences associated with and without a timing offset in the sampling.

FIGS. 2A-C, there is shown an embodiment 2000 of the spur logic illustrated in FIG. 1 as well as embodiments of a STF, a timeline, and a timing offset error related thereto. Referring to the FIG. 2A, the embodiment 2000 comprises a time-interleaved analog-to-digital conversion (ADC) module 2010 and the PHY logic 2015.

The time-interleaved ADC module 2010 module may convert analog signals of a received wireless communication packet into digital samples to be processed by the PHY logic 2015. In many embodiments, the time-interleaved ADC module 2010 may comprise than one time-interleaved ADC components that operate at a slower rate than the frequency of the signal to achieve higher rate conversion with ADC components operating at lower frequencies. In some embodiments, the time interleaving allows the ADC components to achieve conversion rates that are either not possible with a single converter or are infeasible or impracticable.

Interleaving multiple ADC components to achieve higher rates of conversion may introduce DC bias into the output of each of the ADC components, which causes harmonics (spurs) at the ADC output.

In the present embodiment, the time-interleaved ADC module 2010 may comprise N In-phase ADC components 2004 and N Quadrature phase ADC components 2005 to convert both the In-phase and Quadrature phase signals. In other embodiments, the time-interleaved ADC module 2010 may convert a single communication signal.

In some embodiments, multiple samples are taken per sequence. In one embodiment, for instance, the ADC components may determine 192 samples from the communication signal per Golay sequence. Each ADC component may take more than one samples of each Golay sequence. For example, the ADC(1) component may take the first sample, (N+1)th sample, (2*N+1)th sample, etc. The ADC(2) component may take the second sample, (N+2)th sample, (2*N+2)th sample, etc. And so on through to the ADC(N) component that may take the Nth sample, (2*N)th sample, (3*N)th sample, etc.

The PHY logic 2015 may comprise spur logic 2020, ACQ logic 2040, and frequency domain logic 2060. The spur logic 2020 may perform spur estimation for an input signal 2012 received as input from time-interleaved ADC module 2010 based upon input 2032 from the ACQ logic 2040 and may output a spur and FO corrected signal 2050 to frequency domain logic 2060 for further processing. The spur logic 2020 may sample the input signal 2012 to determine means of each of a set of sequences in the preamble, select the appropriate means to perform a spur estimation, determine the spur estimation based upon a frequency offset estimation (FOE), subtract a mean of the spur estimations, subtract the mean of the spur estimation from the spur estimations, and subtract the spur estimations from the digital signal received as input from the time-interleaved ADC module 2010. The spur logic 2020 may comprise mean logic 2022, buffers 2025, spur estimation logic 2026, mean removal logic 2028, and spur removal logic 2029.

Referring also to FIG. 2B, there is shown a timeline 2100 that is an example of timeline that may govern the process of spur estimation performed by the spur logic 2020. Time passes as the timeline 2100 progresses from left to right and the input signal 2112 in FIG. 2B may correspond to the input signal 2012 in FIG. 2A for embodiments in which the PHY logic 2015 in FIG. 2A performs the process according to the timeline 2100 illustrated in FIG. 2B.

The input signal 2112 illustrates an embodiment of part of a preamble of a communications signal. In the present embodiment, the part of the preamble represents part of a single carrier (SC) preamble field in a WiGig/IEEE 802.16ad device that is composed of a concatenation of 16 Ga Golay sequences, followed by −Ga in a STF and a −Gb sequence, which is the first sequence of CE field. The remainder of the CE field is represented by CE (GU,GV). The Golay sequences (both Ga and Gb) contain non-zero components at the spur frequencies, and pass through unknown multipath channel, frequency offset and Tx/Rx phase noise. Note that the first Golay sequence in the CE field is illustrated separately from the rest of the CE field for the purposes of describing the effects of timing offset in samples, which is discussed in more depth in relation to FIG. 2C.

The timeline 2100 begins with an Rx enabled and search for packet phase 2110. During this phase 2110, the spur logic 2020 is beginning to receive a wireless communications packet from the time-interleaved ADC module 2010. A packet typically comprises a preamble followed by a payload.

In many embodiments, the ACQ logic 2040 may be configured to detect a plurality of sequences of the preamble of a packet of the input signal 2012, e.g., based on samples received from spur logic 2020 as ACQ input 2030. The ACQ logic 2040 may perform automatic gain control (AGC) to select a stable analog gain for the input signal 2112, perform edge detection for the Golay sequences to determine the boundaries of the Golay sequences during a detection phase 2120, detect the sync position in the input signal 2012 during a sync phase 2130, and determine a FOE between the sequences during the sync phase 2130, which identifies the end of the short training sequences and the beginning of the CE phase 2140.

During the Rx enabled and search for packet phase 2110, the ACQ logic 2040 may perform automatic gain control and output 2032 to the spur logic 2020, the analog gain stable (AGS) position 2125 in the preamble of the packet. After the AGS position is identified, the gain is stable.

During the detection phase 2120, the ACQ logic 2040 may determine the boundaries of the Golay sequences. Once the ACQ logic 2040 detects an edge of a Golay sequence 2132, the ACQ logic 2040 and the spur logic 2020 enter the sync phase 2130.

During the sync phase 2130, the mean logic 2022 begins determining means for Golay sequences and storing the results in buffers 2025, which is depicted as an arrow pointed to "M" in FIG. 2B. During the sync phase 2130, the ACQ logic 2040 may locate the [Ga, —Ga] 2135 section, denoted as the "sync position", and may estimate the FO.

The sync phase 2130 ends and the CE phase 2140 begins in response to the ACQ logic 2040 outputting 2032 the sync position 2135 and the FOE to the spur logic 2020. Furthermore, the mean logic 2022 stops determining means "M" of the sequences and may begin to determine the spur estimations for each of the ADC components in response to identification of the sync position 2135 and receipt of the FOE. In particular, the spur estimation logic 2026 may determine a spur estimation based upon the means (M1 and M2) 2137 that the mean logic 2022 stored in the buffers 2025 for the last two Golay sequences, Ga and −Ga 2135 of the STF. In some embodiments, the spur logic 2020 may identify the means (M1 and M2) 2137 for each of the ADC components by indices to these value's in the buffers 2025. In other embodiments, these may be the last two values in the buffers 2025 so retrieving the last two values from the buffers 2025 identifies them. And, in some embodiments, the mean logic 2022 may only maintain the last two means in the buffers 2025 for each of the ADC components so the means (M1 and M2) 2137 may be the only values stored in the buffers for each of the ADC components.

The spur logic 2020 may receive the FOE at the same time or near the same time as the sync position (Ga, −Ga) is received from the ACQ logic 2040. The spur estimation logic 2026 may perform spur estimation by using the means (M1 and M2) 2137 because this section of the STF has an average zero mean per ADC component. Note that due to the opposite Golay sequences at the end of the STF segment (Ga, −Ga), the signal has only odd frequency components (i.e., at (2*k+1)*6.875 MHz (MegaHertz), where k is the number of ADC components. Therefore, using this section will estimate spurs that are harmonics of 165 MHz and other spurs that are located on even frequency components (i.e., at Fs/2×N2k=k×13.75 [MHz]) where Fs is the sampling frequency and N is the number of samples of a Golay sequence.

Note that while this embodiment may focus on removing 165 MHz harmonics, further embodiments may remove other harmonics such as harmonics that are any multiple of 13.75 MHz.

In many embodiments, the spur estimations for the signal may contain a DC component for the receiver DC bias and/or the transmitter DC bias so several embodiments may comprise mean removal logic 2028 to remove a mean of the spur estimations for the multiple ADC components from the spur estimations. The spur removal logic 2029 may receive the spur estimations and subtract the spur estimations for each of the ADC components and the spur logic 2020 may correct the signal for frequency offset based upon the FOE to generate the spur and FO corrected signal 2050 to output to the frequency domain logic 2060.

The frequency domain logic 2060 may comprise Fourier transform logic such as a Discrete Fourier transform (DFT) module to transform the time domain, spur and FO corrected signal 2050 to the frequency domain.

An embodiment of the spur logic 2020 for spur estimation and mitigation may be implemented with a mathematical model. If there was no frequency offset, the spur logic 2020 may use a mean of the 16 slices (i.e., each of 16 ADC component outputs) in order to estimate the DC offset for each of the ADC components. However, frequency offset causes a phase-rotation of the sequence (−Ga is rotated by $e^{j\theta}$ relative to Ga).

For each of 16 slices, average 12 samples in each Golay sequence:

$$m_1^k = \frac{\sum_{l=0}^{11} y[k+16l]}{12}$$

$$m_2^k = \frac{\sum_{l=0}^{11} y[k+16l+192]}{12}$$

Where: y is the input signal and k is the slice index. Mean results $m_1^k$, $m_2^k$ are given by:

$$m_1^k = c_k + s_k + v_2^k$$

$$m_2^k = dc_k - s_k e^{j\theta} + v_2^k$$

Where: $dc_k$ is the DC value of the $k_{th}$ ADC (the parameter we want to estimate),
$s_k$: signal related element,
$v_1$, $v_2$: Noise terms.

Using the ACQ logic 2040 output of the frequency offset estimation (FOE), the spur logic 2020 may calculate the phase difference that is accumulated over 192 samples and compensate for this phase rotation as follows:

$$dc_{est}^k = \frac{m_1^k + m_2^k e^{-j\theta}}{1+e^{-j\theta}} =$$

$$\frac{e^{-j\frac{\theta}{2}}\left(m_1^k e^{+j\frac{\theta}{2}} + m_2^k e^{-j\frac{\theta}{2}}\right)}{e^{-j\frac{\theta}{2}}\left(e^{+j\frac{\theta}{2}} + e^{-j\frac{\theta}{2}}\right)} = \frac{1}{2}\cdot\left[(m_1^k + m_2^k) + j(m_1^k - m_2^k)\tan\left(\frac{\theta}{2}\right)\right].$$

The final result has an elegant interpretation of a simple mean with a correction term that is related to the estimated frequency offset. Note that the solution has low complexity and requires only summations and one real multiplication (for each of the 16 slices). In addition, all the processing may be performed in the time-domain.

Due to transmitter-DC (i.e., DC component that is due to DC offset/carrier leakage of the transmitter), the spur logic 2020 may use a different algorithm to estimate the receiver DC component. The spur logic 2020 may remove the mean of the 16 estimations as follows:

$$\text{spur}_{est}^k = dc_{est}^k - \frac{1}{16}\sum_{l=1}^{16} dc_{est}^l$$

Phase noise causes phase rotation of the signal and its effect is similar to the effect of Frequency Offset, but due to the fact that it is highly correlated over one Golay sequence, phase noise is not a limiting factor of the estimation.

In sum, an embodiment of a mathematical model for determining the spur estimations and mitigating the spurs by the spur logic 2020 may include:

AGC phase: at the end of this phase the gain is stable.
Detection: ACQ finds the boundaries of the Ga's.
For each slice: Estimating mean and storing them in a FIFO (×16 slices, ×2 for I/Q), wherein I/Q refers to In-phase and Quadrature signals.
Sync: ACQ locates the [Ga,−Ga] section and estimates the Frequency Offset (FO).
For each slice:
  i. Spur logic 2020 may use the latest average values (M1 and M2) that are stored in the FIFO.
  ii. Estimate spur per slice, wherein k represents the number of slices (e.g., 1 through 16):

$$dc_{est}^k = \frac{1}{2} \cdot \left[(m_1^k + m_2^k) + j(m_1^k - m_2^k)\tan\left(\frac{\theta}{2}\right)\right]$$

Remove the mean component from the spur estimation:

$$\overline{dc}_{est}^k = dc_{est}^k - \frac{1}{16}\sum_{l=1}^{16} dc_{est}^l$$

Subtract $dc_{est}^k$ per slice.

Referring to FIG. 2C illustrates an embodiment of a Golay sequence of a short training sequence in a preamble of a packet to sample for spur estimation along with examples of values of the Golay sequences associated with and without a timing offset in the sampling.

As seen in the graph 2400, positive timing offsets do not increase mean logic 2022 mean estimation error. However, negative timing offsets can be significant. The reason for this effect relates to the first half of the −Gb sequence (first Golay sequence of the CE). The first half of the −Gb sequence equals the first half of Ga. In other words, if the timing offset (TO) is as illustrated in FIG. 2D, the mean of the values of Part I and Part II is the same.

Because positive timing offset (up to 64 samples) has no effect on the results, a deliberate offset of 30 samples (similar to guard interval used in OFDM) can be added so that the calculations may tolerate up to [−30, 33] samples of timing offset uncertainty.

Referring again to FIG. 1, the network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, the network 1005 communicatively couples communications devices 1010, 1030, 1050, and 1055.

The communication devices 1010 and 1030 comprise processor(s) 1001 and 1002, memory 1011 and 1031, and MAC sublayer logic 1018 and 1038, respectively. The processor(s) 1001 and 1002 may comprise any data processing device such as a microprocessor, a microcontroller, a state machine, and/or the like, and may execute instructions or code in the memory 1011 and 1031. The memory 101*l* and 1031 may comprise a storage medium such as Dynamic Random Access Memory (DRAM), read only memory (ROM), buffers, registers, cache, flash memory, hard disk drives, solid-state drives, or the like. The memory 1011 and 1031 may be coupled with the MAC sublayer logic 1018 and 1038, respectively, and/or may be coupled with the PHY devices, transceivers 1020 and 1040, respectively. In many embodiments, the memory 1011 and 1031 may comprise memory 1012 and 1032, respectively. The memory 1012 and 1032 may be allocated to store the frames and/or the frame structures, as well as frame headers or portions thereof. In many embodiments, the frames may comprise fields based upon the structure of the standard frame structures identified in IEEE 802.11.

The MAC sublayer logic 1018 and 1038 may comprise logic to implement functionality of the MAC sublayer of the data link layer of the communications devices 1010 and 1030, respectively. The MAC sublayer logic 1018 and 1038 may generate the frames such as management frames, data frames, and control frames, and may communicate with the PHY logic 1029 and 1039, respectively. The PHY logic 1029 and 1039 may generate physical layer protocol data units (PPDUs) based upon the frames. More specifically, the frame builders may generate frames and the data unit builders of the PHY logic 1029 and 1039 may prepend the frames with preambles to generate PPDUs for transmission via a physical layer (PHY) device such as the transceivers (RX/TX) 1020 and 1040, respectively.

The MAC frame, also referred to as MAC layer Service Data Units (MSDUs), may comprise, e.g., a management frame. For example, a frame builder may generate a management frame such as the beacon frame to identify the communications device 1010 as having capabilities such as supported data rates, power saving features, cross-support, and a service set identification (SSID) of the network to identify the network to the communications device 1030. The MAC sublayer logic 1018 may pass the frame to the PHY logic 1029 and the PHY logic 1029 may prepend a preamble to generate a PHY frame prior to transmitting the PHY frame. The PHY frame is also referred to as a PPDU.

The communications devices 1010, 1030, 1050, and 1055 may each comprise a transmitters and receivers such as transceivers (RX/TX) 1020 and 1040. In many embodiments, transceivers 1020 and 1040 implement four different PHY layers: Control PHY, SC (single carrier) PHY, OFDM PHY and low-power SC PHY (LPSC PHY). Control PHY is modulation and coding scheme 0 (MCS0). SC starts at MCS1 and ends at MCS12; OFDM PHY starts at MCS13 and ends at MCS24; and LPSC starts at MCS25 and ends at MCS31. MCS0 to MCS4 may be mandatory PHY MCSs.

Note that this is just illustrative of the schemes that may be included in many embodiments but embodiments are not so limited. For example, other embodiments may only have one or more MCS's of the Control PHY and SC PHY or one or more MCS's of the Control PHY, SC PHY, and OFDM.

The PHY logic 1029 and 1039 may implement a method of encoding digital data on multiple carrier frequencies. The PHY logic 1029 and 1039 may comprise a frequency-division multiplexing scheme used as a digital multi-carrier modulation method. Data may be carried in a large number of closely spaced orthogonal subcarrier signals. The data may be divided into several parallel data streams or channels, one for each subcarrier. Each subcarrier may be modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs.

Guard intervals may be inserted between symbols such as between every OFDM symbol as well as between the STF and long training field (LTF) symbols in the front end of the transmitter during transmission to avoid inter-symbol interference (ISI). ISI might result from multi-path distortion.

Each transceiver 1020 and 1040 comprises a radio 1025 and 1045, respectively, comprising an RF transmitter and an RF receiver. The PHY logic 1029 and 1039 may transform information signals into signals to be applied via the radios 1025 and 1045 to elements of an antenna(s) 1024 and 1044, respectively. An RF receiver receives electromagnetic energy at an RF frequency via elements of an antenna(s) 1024 and 1044 and radios 1025 and 1045, respectively. The PHY logic 1029 and 1039 may extract the digital data from the symbols received via the radios 1025 and 1045, respectively.

In some embodiments, the communications device 1010 comprises a Beam Former (BF) 1023. The BF 1023 may comprise a device that performs digital beam forming such as a Digital Beam Former (DBF) or any other process for beam forming. The BF 1023 may process to signals to create directional transmissions based upon constructive and destructive interferences between the waveforms to be applied to elements of antenna(s) 1024. The antenna(s) 1024 may be an array of individual, separately excitable antenna elements. The signals applied to the elements of the antenna(s) 1024 cause the antenna(s) 1024 to radiate one to four spatial channels. Each spatial channel so formed may carry information to one or more of the communications devices 1030, 1050, and 1055.

Similarly, the communications device 1030 comprises the transceiver (RX/TX) 1040 to receive and transmit signals from and to the communications device 1010. The transceiver (RX/TX) 1040 may comprise an antenna(s) 1044 and, optionally, a BF 1043. The elements of the antenna(s) 1044 may receive signals in, e.g., one to four spatial channels and the BF 1043 may be trained to received directional signals from a transmitter.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

Figure 3:
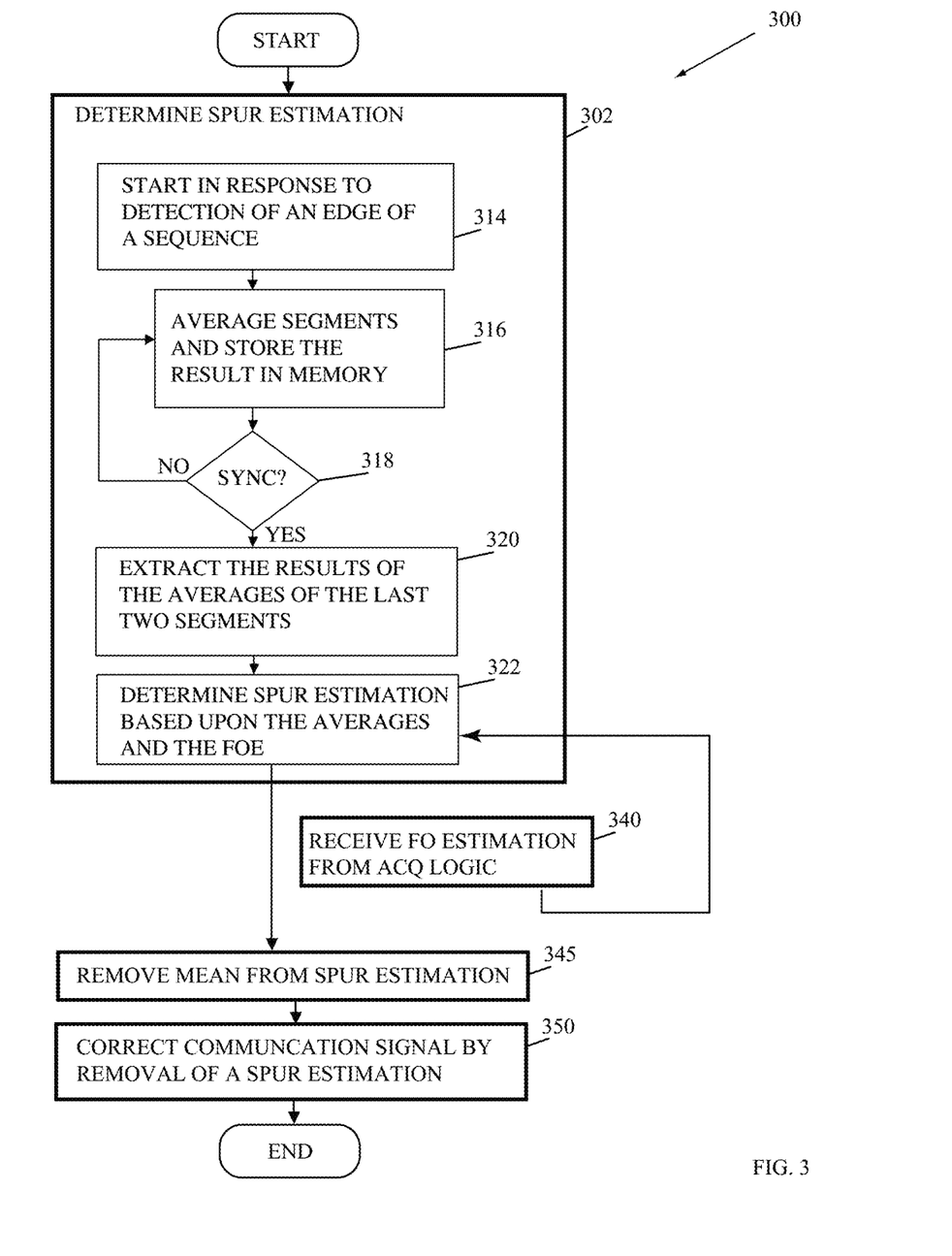
FIG. 3 depicts an embodiment of a flowchart to estimate and mitigate spur impairment in a packet such as is illustrated in FIGS. 1-2.

FIG. 3 depicts an embodiment of a flowchart 300 to estimate and mitigate spur impairment in a packet such as is illustrated in FIGS. 1-2. The flowchart 300 begins with spur logic, such as the spur logic 1046 in FIG. 1 or the spur logic 2020 in FIG. 2A receiving a packet from a time-interleaved, analog-to-digital conversion module. The spur logic may determine spur estimation (element 302).

The spur logic may implement processes for determining the spur estimations including a process such as the process of the spur estimation logic 2022 in FIG. 2A and may start in response to detection of an edge of a sequence in a preamble of the input signal (element 314). Thereafter, determining the spur estimation 302 may average segments of Golay sequences and store the result in memory for each of the time-interleaved, analog-to-digital conversion components (element 316). Until the spur logic receives an indication of the sync position, determining the spur estimation 302 may continue to average segments of Golay sequences and store the result in memory for each of the time-interleaved, analog-to-digital conversion components (element 316).

On or about the same time that the spur logic receives an indication of the sync position (element 318), the spur logic may receive an indication of a frequency-offset estimation (FOE) from, e.g., ACQ logic (element 340) such as the ACQ logic 2040 in FIG. 2A. In response to receiving an indication of the sync position (element 318) and the frequency offset estimation, the spur logic may extract the results (M1 and M2) from the memory for the last two segments or blocks (element 320) and determine the spur estimations for each of the ADC components based upon the means M1 and M2 of the of the last two segments (Ga and −Ga) for each of the ADC components and the frequency offset estimation (element 322).

In some embodiments, prior to correcting the signal, the spur logic may remove the mean of the spur estimations from the spur estimations (element 345). The spur logic may then subtract the spur estimations from the signal and correct the FO in the signal to generate a spur and FO corrected signal (element 350).

The following examples pertain to further embodiments. One example comprises an apparatus for spur estimation of a wireless communication packet. The apparatus may comprise mean logic to receive an input signal output by a set of analog-to-digital converters and to determine means of sequences for each of the analog-to-digital converters, wherein the sequences are from a preamble of the wireless communication packet; and spur estimation logic to determine spur estimations for each of the analog-to-digital converters based upon a frequency offset estimation for the wireless communication packet.

In some embodiments, the apparatus may further comprise a processor, a memory. coupled with the processor, a radio coupled with the physical layer logic, and one or more antennas coupled with the radio to receive the response. In some embodiments, the apparatus may further comprise mean removal logic to remove a mean of the spur estimations from the spur estimations. In some embodiments, the apparatus may further comprise spur removal logic to remove the spur estimations from the packet. In some embodiments, the sequences comprise a set of short training sequences with an average zero mean received after ACQ logic detects a boundary of the sequences. In some embodiments, the set of short training sequences comprises a Golay sequence Ga and a Golay sequence −Ga.

Another embodiment comprises one or more tangible computer-readable non-transitory storage media comprising computer-executable instructions operable to, when executed by at least one computer processor, to implement a method comprising receiving an input signal output by a set of analog-to-digital converters; determining means of sequences for each of the analog-to-digital converters, wherein the sequences are from a preamble of the wireless communication packet; and determine spur estimations for each of the analog-to-digital converters based upon a frequency offset estimation for the wireless communication packet.

In some embodiments, the storage media may further comprise removing a mean of the spur estimations from the spur estimations. In some embodiments, the storage media may further comprise removing the spur estimations from the packet. In some embodiments, the sequences comprise a set of short training sequences with an average zero mean received after ACQ logic detects a boundary of the sequences. In some embodiments, the set of short training sequences comprises a Golay sequence Ga and a Golay sequence −Ga.

Another embodiment may comprise a method for spur estimation of a wireless communication packet. The method may comprise receiving an input signal output by a set of analog-to-digital converters; determining means of sequences for each of the analog-to-digital converters, wherein the sequences are from a preamble of the wireless communication packet; and determine spur estimations for each of the analog-to-digital converters based upon a frequency offset estimation for the wireless communication packet.

In some embodiments, the method may further comprise removing a mean of the spur estimations from the spur estimations. In some embodiments, the method may further comprise removing the spur estimations from the packet. In some embodiments, the sequences comprise a set of short training sequences with an average zero mean received after ACQ logic detects a boundary of the sequences. In some embodiments, the set of short training sequences comprises a Golay sequence Ga and a Golay sequence –Ga.

In a further embodiment, a system may comprise a processor; a memory coupled with the processor; radio comprising a set of analog-to-digital converters; mean logic to receive an input signal output by the set of analog-to-digital converters and to determine means of sequences for each of the analog-to-digital converters, wherein the sequences are from a preamble of the wireless communication packet; and spur estimation logic to determine spur estimations for each of the analog-to-digital converters based upon a frequency offset estimation for the wireless communication packet; and one or more antennas coupled with the radio to receive the packet.

In some embodiments, the radio comprises mean removal logic to remove a mean of the spur estimations from the spur estimations. In some embodiments, the radio comprises spur removal logic to remove the spur estimations from the packet. In some embodiments, the sequences comprise a set of short training sequences with an average zero mean received after ACQ logic detects a boundary of the sequences. In some embodiments, the set of short training sequences comprises a Golay sequence Ga and a Golay sequence –Ga.

Another embodiment may comprise an apparatus for spur estimation of a wireless communication packet. The apparatus may comprise a means for determining means of sequences for each of the analog-to-digital converters, wherein the sequences are from a preamble of the wireless communication packet; and a means for determining spur estimations for each of the analog-to-digital converters based upon a frequency offset estimation for the wireless communication packet.

In some embodiments, the apparatus may further a means for removing a mean of the spur estimations from the spur estimations. In some embodiments, the apparatus may further comprise a means for removing the spur estimations from the packet. In some embodiments, the sequences comprise a set of short training sequences with an average zero mean received after ACQ logic detects a boundary of the sequences. In some embodiments, the set of short training sequences comprises a Golay sequence Ga and a Golay sequence –Ga.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features.

For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

Another embodiment is implemented as one or more tangible computer-readable non-transitory storage media comprising computer-executable instructions operable to, when executed by at least one computer processor, enable the at least one computer processor to implement systems and methods described with reference to FIGS. 1-3. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

What is claimed is:

1. An apparatus for spur estimation of a wireless communication packet, the apparatus comprising:
a physical layer (PHY) device to receive an input signal output by a set of analog-to-digital converters;
to determine means of sequences for each of the analog-to-digital converters, wherein the sequences are from a preamble of the wireless communication packet;
to identify the means of a subset of the sequences with an average zero mean for each of the analog-to-digital converters;
and
to determine spur estimations for each of the analog-to-digital converters based upon a frequency offset estimation for the wireless communication packet and based upon the means of the subset of the sequences.

2. The apparatus of claim 1, further comprising a processor, a memory coupled with the processor, a radio coupled with the PHY device, and one or more antennas coupled with the radio.

3. The apparatus of claim 1, further comprising mean removal logic to remove a mean of the spur estimations from the spur estimations.

4. The apparatus of claim 3, further comprising spur removal logic to remove the spur estimations from the packet.

5. The apparatus of claim 1, wherein the subset of the sequences comprise a set of short training sequences with an average zero mean received after an acquisition (ACQ) logic detects a boundary of the sequences.

6. The apparatus of claim 5, wherein the set of short training sequences comprises a Golay sequence Ga and a Golay sequence −Ga.

7. One or more tangible computer-readable non-transitory storage media comprising computer-executable instructions operable to, when executed by at least one computer processor, enable the at least one computer processor to implement a method comprising:
receiving an input signal output by a set of analog-to-digital converters;
determining means of sequences for each of the analog-to-digital converters, wherein the sequences are from a preamble of the wireless communication packet;
identifying the means of a subset of the sequences with an average zero mean for each of the analog-to-digital converters; and
determining spur estimations for each of the analog-to-digital converters based upon a frequency offset estimation for the wireless communication packet and based upon the means of the subset of the sequences.

8. The storage media of claim 7, wherein the method further comprises removing a mean of the spur estimations from the spur estimations.

9. The storage media of claim 8, wherein the method further comprises removing the spur estimations from the packet.

10. The storage media of claim 7, wherein the subset of the sequences comprise a set of short training sequences with an average zero mean received after an acquisition (ACQ) logic detects a boundary of the sequences.

11. The storage media of claim 10, wherein the set of short training sequences comprises a Golay sequence Ga and a Golay sequence −Ga.

12. A method for spur estimation of a wireless communication packet, the method comprising:
receiving an input signal output by a set of analog-to-digital converters;
determining means of sequences for each of the analog-to-digital converters, wherein the sequences are from a preamble of the wireless communication packet;
identifying the means of a subset of the sequences with an average zero mean for each of the analog-to-digital converters; and
determining spur estimations for each of the analog-to-digital converters based upon a frequency offset estimation for the wireless communication packet and based upon the means of the subset of the sequences.

13. The method of claim 12, further comprising removing a mean of the spur estimations from the spur estimations.

14. The method of claim 13, further comprising removing the spur estimations from the packet.

15. The method of claim 12, wherein the subset of the sequences comprise a set of short training sequences with an average zero mean received after an acquisition (ACQ) logic detects a boundary of the sequences.

16. The method of claim 15, wherein the set of short training sequences comprises a Golay sequence Ga and a Golay sequence −Ga.

17. A system for spur estimation of a wireless communication packet, the system comprising:
a processor;
a memory coupled with the processor;
a radio comprising a set of analog-to-digital converters; a physical layer (PHY) device to receive an input signal output by the set of analog-to-digital converters; to determine means of sequences for each of the analog-to-digital converters, wherein the sequences are from a preamble of the wireless communication packet; to identify the means of a subset of the sequences with an average zero mean for each of the analog-to-digital converters; and to determine spur estimations for each of the analog-to-digital converters based upon a frequency offset estimation for the wireless communication packet and based upon the means of the subset of the sequences; and
one or more antennas coupled with the radio to receive the packet.

18. The system of claim 17, wherein the radio comprises mean removal logic to remove a mean of the spur estimations from the spur estimations.

19. The system of claim 18, wherein the radio comprises spur removal logic to remove the spur estimations from the packet.

20. The system of claim 17, wherein the subset of the sequences comprise a set of short training sequences with an average zero mean received after an acquisition (ACQ) logic detects a boundary of the sequences.

21. The system of claim 20, wherein the set of short training sequences comprises a Golay sequence Ga and a Golay sequence −Ga.

* * * * *